(12) United States Patent
Bergström et al.

(10) Patent No.: US 10,091,808 B2
(45) Date of Patent: Oct. 2, 2018

(54) SYSTEM AND METHOD FOR HANDLING UPLINK TRANSMISSIONS

(71) Applicant: TELEFONAKTIEBOLAGET LM ERICSSON (PUBL), Stockholm (SE)

(72) Inventors: Mattias Tan Bergström, Stockholm (SE); Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 15/008,577

(22) Filed: Jan. 28, 2016

(65) Prior Publication Data

US 2016/0227566 A1  Aug. 4, 2016

Related U.S. Application Data

(60) Provisional application No. 62/109,267, filed on Jan. 29, 2015.

(51) Int. Cl.
| | |
|---|---|
| *H04W 72/12* | (2009.01) |
| *H04W 74/08* | (2009.01) |
| *H04W 72/04* | (2009.01) |
| *H04W 72/14* | (2009.01) |

(52) U.S. Cl.
CPC ... *H04W 72/1268* (2013.01); *H04W 74/0808* (2013.01); *H04W 72/0413* (2013.01); *H04W 72/14* (2013.01)

(58) Field of Classification Search
None
See application file for complete search history.

(56) References Cited

U.S. PATENT DOCUMENTS

| | | |
|---|---|---|
| 2011/0194518 A1 | 8/2011 | Wu |
| 2013/0195079 A1 | 8/2013 | Xu |
| 2014/0362832 A1* | 12/2014 | Rudolf ............... H04L 1/1822 370/336 |
| 2016/0219545 A1* | 7/2016 | Zhang ............... H04L 1/1848 |

FOREIGN PATENT DOCUMENTS

EP  2 129 157 A1  12/2009

* cited by examiner

*Primary Examiner* — Ayaz Sheikh
*Assistant Examiner* — Sori Aga
(74) *Attorney, Agent, or Firm* — Sage Patent Group

(57) ABSTRACT

In one example embodiment, a method by a wireless device includes attempting to transmit a first data packet during a first transmission time interval. During a second transmission time interval that is subsequent to the first transmission time interval, a second data packet is transmitted if the transmission of the first data packet during the first transmission time interval was successful. The second data packet includes data that is exclusive of the data of the first data packet. Alternatively, if the transmission of the first data packet during the first transmission time interval was not successful, a third data packet is transmitted. The third data packet includes data that includes at least a portion of the data of the first data packet.

17 Claims, 16 Drawing Sheets

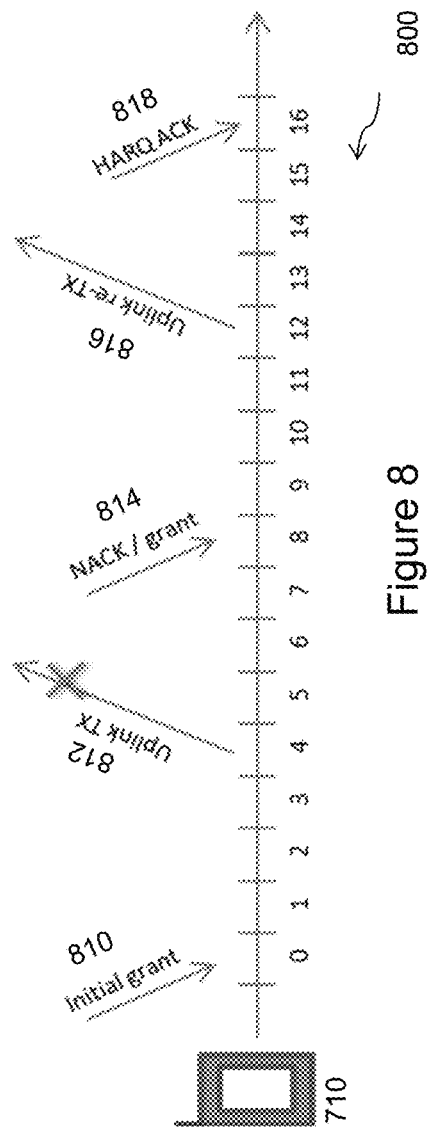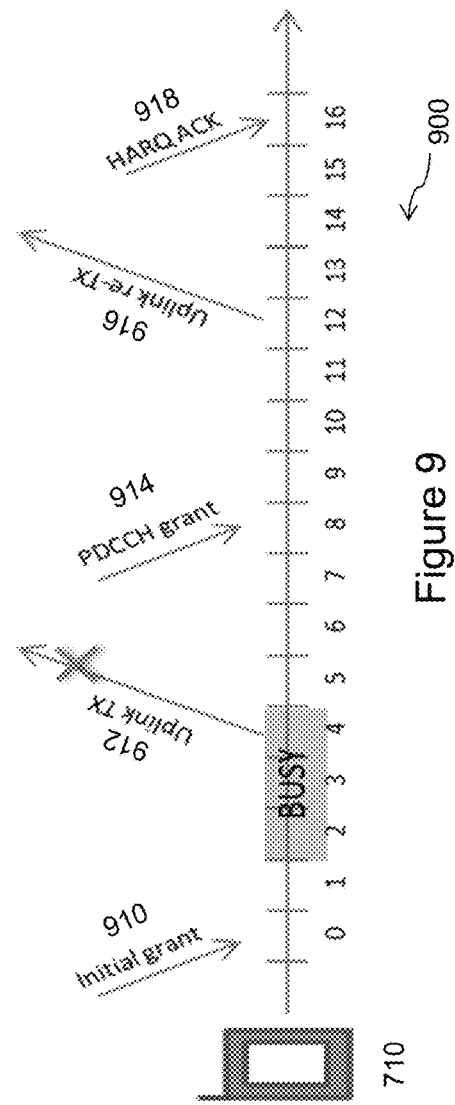

SYSTEM AND METHOD FOR HANDLING UPLINK TRANSMISSIONS

TECHNICAL FIELD

Particular embodiments relate generally to wireless communications and more particularly to system and method for handling uplink transmissions.

BACKGROUND

In the future, Licensed-Assisted Access (LAA) will likely allow LTE equipment to operate in the unlicensed 5 GHz radio spectrum. The unlicensed 5 GHz spectrum will be used as a complement to the licensed spectrum. Accordingly, devices may connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so called listen-before-talk (LBT) method may be applied. LBT involves sensing the medium for a pre-defined minimum amount of time and backing off if the channel is busy. Today, the unlicensed 5 GHz spectrum is mainly used by equipment implementing the IEEE 802.11 Wireless Local Area Network (WLAN) standard. This standard is known under its marketing brand "Wi-Fi."

Due to the LBT procedure, the first slot in which the LAA SCell or LAA UE is permitted to transmit cannot be predicted in advance. This makes it difficult to pre-compute the data payload since several parameters are currently dependent on the slot number in which data is transmitted.

LTE uses OFDM (orthogonal frequency-division multiplexing) in the downlink and DFT-spread OFDM (also referred to as single-carrier FDMA) in the uplink. The basic LTE downlink physical resource can thus be seen as a time-frequency grid. FIG. 1 illustrates an example time-frequency grid 100 where each resource element 110 corresponds to one OFDM subcarrier 112 during one OFDM symbol interval. The uplink subframe has the same subcarrier spacing as the downlink and the same number of SC-FDMA (single carrier-frequency division multiple access) symbols in the time domain as OFDM symbols in the downlink.

FIG. 2 illustrates an exemplary time-domain structure 200. As depicted, LTE downlink transmissions are organized into radio frames 202 of 10 ms. As shown in FIG. 2, each radio frame consists of ten equally-sized subframes 204 of length Tsubframe=1 ms. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled. FIG. 3 depicts an exemplary downlink subframe structure 300. As shown, in each subframe 302, the base station transmits control information in a control region 304. The control information identifies to which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

LTE Rel-11 and later embodiments allow the above-described resource assignments to also be scheduled on the enhanced Physical Downlink Control Channel (EPDCCH). Conversely, for Rel-8 to Rel-10 embodiments, only Physical Downlink Control Channel (PDCCH) is available.

The reference symbols shown in the above FIG. 3 are the cell specific reference symbols (CRS) and are used to support multiple functions including fine time and frequency synchronization and channel estimation for certain transmission modes.

The generation of the baseband transmit signal on the physical shared channels for either the DL or UL generally involve scrambling, modulation mapping, layer mapping, precoding, and RE mapping. FIG. 4 illustrates an exemplary specific baseband processing chain 400 for the UL PUSCH (Physical Uplink Shared Channel) that includes scramblers 402, modulation mappers 404, layer mapper 406, transform precoders 408, precoder 410, resource element mappers 412, and SC-FDMA signal generators 414. For PUSCH scrambling, the initialization of the scrambling sequence generator at the start of each subframe is a function of the current slot number $n_s$. This is also true for PDSCH (Physical Downlink Shared Channel) scrambling on the DL.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. FIG. 5 illustrates a carrier aggregation scheme 500, according to an exemplary embodiment. A CA-capable UE is assigned a primary cell (PCell) which is always activated, and one or more secondary cells (SCells) which may be activated or deactivated dynamically.

In certain embodiments, the number of aggregated CC as well as the bandwidth of the individual CC may be different for uplink and downlink. A symmetric configuration refers to a scenario wherein the number of CCs in downlink and uplink are the same. Conversely, an asymmetric configuration refers to a scenario wherein the number of CCs is different. It is important to note that the number of CCs configured in a cell may be different from the number of CCs seen by a terminal. For example, a terminal may support more downlink CCs than uplink CCs even though the cell is configured with the same number of uplink and downlink CCs.

In addition, a key feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a wireless device expects to receive scheduling messages on the (E)PDCCH on just one CC. The CC may be the same CC or a different CC via cross-carrier scheduling. The mapping from (E)PDCCH to PDSCH may also be configured semi-statically.

In typical deployments of WLAN, carrier sense multiple access with collision avoidance (CSMA/CA) is used for medium access. FIG. 6 illustrates an example CSMA/CA scheme, according to certain embodiments. As depicted, the channel is sensed to perform a clear channel assessment (CCA) at first time interval 602. A transmission is initiated at a second time interval 604 only if the channel is declared as Idle at first time interval 602. In case the channel is declared as Busy during first time interval 602, the transmission is essentially deferred until the channel is deemed to be Idle. When the range of several APs using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded.

Conventionally, the spectrum used by LTE is dedicated to LTE. This has the advantage that an LTE system does not need to care about the coexistence issue and the spectrum efficiency can be maximized. However, the spectrum allocated to LTE is limited and cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

One way to utilize the unlicensed spectrum reliably is to transmit essential control signals and channels on a licensed carrier. FIG. 7 illustrates an exemplary network system 700 providing LAA in the unlicensed spectrum using LTE carrier aggregation. As depicted, a wireless device 710 is connected to a PCell 720 in the licensed band and one or more SCells 730 in the unlicensed band. As described herein, a secondary cell in unlicensed spectrum may be referred to as a licensed-assisted access secondary cell (LAA SCell).

To operate in unlicensed bands, a wireless device 710 must obey certain rules. For example, a transmitting wireless device 710 should listen on the carrier before the transmitting wireless device 710 begins to transmit. If the medium is free, the transmitting wireless device 710 can transmit. Conversely, if the medium is busy, such as when another wireless device or node is transmitting, the transmitting wireless device 710 should suppress the transmission and try again at a later time. This process of listening before transmitting and only transmitting when the medium is free may be referred to as listen before talk (LBT). As described, LBT results in transmissions in the unlicensed band being delayed until the medium becomes free again. Where there is no coordination between the transmitting wireless devices and nodes (which is often the case), the delay may appear random.

In LTE, a hybrid automatic repeat request (HARQ) protocol is used for transmissions in both UL and DL. Per the HARQ protocol, the transmitting wireless device 710 will perform transmissions of data to the receiver until the receiver indicates that the data was successfully received or a maximum number of transmissions have been reached. The indication of a successful transmission may be in the form of a positive HARQ feedback message, which may also be referred to as an acknowledgement or ACK. When the receiver receives one reception but fails to successfully decode the data, the receiver will request the transmitting wireless device 710 to retransmit the data. Such a request may include a negative HARQ feedback, which may also be referred to as a NACK.

As described above, the transmitting wireless device 710 may transmit the data several times before it is successfully decoded. In such a case, the receiver can combine all receptions to make accurate decoding more likely since the receiver is more likely to correctly decode data with a higher number of receptions.

In uplink the HARQ timing is synchronous. This means that the timing between the UL transmissions and the HARQ feedback in the DL as well as the timing between the HARQ feedback and retransmissions is fixed and in frequency division duplex (FDD) is fixed to be 4 ms, in some embodiments, which leads to an 8 ms HARQ round trip time.

When wireless device 710 receives a PDCCH with an UL grant for new transmission (e.g. with NDI=1 and RVI=0), wireless device 710 will perform the PUSCH transmission 4 ms later. If the data was not correctly decoded by the network, the network will respond with a NACK to prompt wireless device 710 to perform the retransmission with another redundancy version. Alternatively, the network may send another PDCCH grant for adaptive retransmission in case of DTX. Wireless device 710 will perform a retransmission 4 ms later. If the data is correctly decoded after the retransmission, the network will respond with an ACK and may send a PDCCH with an UL grant with toggled NDI to trigger wireless device 710 to send the next data.

FIG. 8 illustrates an example HARQ process. As depicted, wireless device 710 receives an initial grant 810 at subframe 0 and performs an initial transmission 812 in subframe 4. In the depicted example scenario, the initial transmission 812 is lost. As a result, wireless device 710 receives a NACK or PDCCH with an UL grant order 814 in subframe 8 and performs a re-transmission 816 in subframe 12. Because re-transmission 816 is successfully decoded by the receiving network node, wireless device 710 receives an ACK 818 in subframe 16.

When wireless device 710 receives an initial grant from the network node, certain components and elements of the wireless device 710 cooperate to generate a packet within the parameters of the initial grant. For example, the PHY layer of wireless device 710 may request the MAC to provide a MAC PDU of a size appropriate for the grant. The MAC layer may then, in turn, request the RLC layer to provide an RLC PDU which fits in the MAC PDU. More specifically, the RLC PDU size may be the MAC PDU size minus headers and MAC CEs. The RLC layer of wireless device 710 may then take data from the top of the buffer to construct the RLC PDU and provide it to the MAC layer. The MAC layer may use the data to construct the MAC PDU and then provide the MAC PDU to PHY. The PHY then performs the transmission. If wireless device 710 receives a second, subsequent UL grant valid for a following TTI, wireless device 710 will repeat the procedure and construct a new MAC PDU with data from the top of the buffer. Within the buffer, the top has moved since wireless device 710 removed data from the buffer to fulfill the first grant.

In certain LAA scenarios, wireless device 710 may also drop an initial transmission (or any subsequent transmission) in response to a LBT procedure that determines the channel is busy. For example, wireless device 710 may receive a grant in subframe n and prepare an UL transmission to be sent in subframe n+4. If the channel again happens to be busy in subframe n+4, wireless device 710 will drop the transmission. At the earliest, wireless device 710 can resend the data one HARQ RTT later.

FIG. 9 illustrates an exemplary LAA process wherein an initial transmission is dropped, in certain embodiments. Specifically, FIG. 9 depicts wireless device 710 receiving an initial grant 910 at subframe 0. Wireless device 710 then performs an LBT procedure, determines the channel is busy, and drops initial transmission 912 in subframe 4. Wireless device 710 then receive a subsequent PDCCH grant 914 and re-transmits the data in subframe 12. If the data is successfully received and decoded, wireless device 701 receives a HARQ ACK 918 in subframe 16.

In certain LAA scenarios, the data transmissions may not only delayed but also received in the wrong order. Consider, for example, the simplified example depicted in FIG. 10. Wireless device 710 receives a first grant 1010 for a first data transmission of 100 bytes in subframe 5 and a second grant 1012 for a second data transmission of 200 bytes in subframe 6. Due to the LBT process and the channel being busy during subframe 5, wireless device 710 may fail to transmit the first data transmission 1014 of 100 bytes in subframe 5 but succeed in transmitting the second data transmission 1016 of 200 bytes subframe 6. As a result, the receiving network node receives the second data transmission 1016 of 200 bytes from somewhere in the middle of the buffer 1020 before the network node receives the first data transmission 1014 of 100 bytes, which are actually from the top of the buffer 1020. The first data transmission 1014 would then be retransmitted in a third data transmission 1018 during subframe 13 or some time thereafter. Because wireless device 710 sends the data transmissions in the order, unnecessary delay and reduced user experience may result.

SUMMARY

According to certain embodiments, a method by a wireless device includes attempting to transmit a first data packet during a first transmission time interval. During a second transmission time interval that is subsequent to the first transmission time interval, a second data packet is transmitted if the transmission of the first data packet during the first transmission time interval was successful. The second data packet includes data that is exclusive of the data of the first data packet. Alternatively, if the transmission of the first data packet during the first transmission time interval was not successful, a third data packet is transmitted. The third data packet includes data that includes at least a portion of the data of the first data packet.

According to certain embodiments, a wireless device for handling uplink transmissions is provided. The wireless device includes an uplink buffer for storing data to be transmitted on an uplink to a network node and a processor having access to the uplink buffer. The processor is operable to attempt to transmit, to the network node, a first data packet during a first transmission time interval. Thereafter, the processor determines whether a transmission of the first data packet during the first transmission time interval was successful. During a second transmission time interval that is subsequent to the first transmission time interval, a second data packet is transmitted if the transmission of the first data packet during the first transmission time interval was successful. The second data packet includes data that is exclusive of the data in the first data packet. Alternatively, if the transmission of the first data packet during the first transmission time interval was not successful, the processor transmits a third data packet. The third data packet includes data that includes at least a portion of the data of the first data packet.

According to certain embodiments, a non-transitory computer readable medium storing logic for handling uplink transmissions is provided. The logic is operable when executed by a processor to attempt to transmit, to the network node, a first data packet during a first transmission time interval. Thereafter, the logic is operable to cause the processor to determine whether a transmission of the first data packet during the first transmission time interval was successful. During a second transmission time interval that is subsequent to the first transmission time interval, a second data packet is transmitted if the transmission of the first data packet during the first transmission time interval was successful. The second data packet includes data that is exclusive of the data in the first data packet. Alternatively, if the transmission of the first data packet during the first transmission time interval was not successful, the processor transmits a third data packet. The third data packet includes data that includes at least a portion of the data of the first data packet.

Some embodiments of the disclosure may provide one or more technical advantages. For example, in certain embodiments, a wireless device applying listen before talk on an LAA carrier may consider the data of the dropped transmission as being available during a subsequent transmission time interval. As a result, the delay for sending data on LAA carriers may be reduced. As another example, an advantage of the proposed solutions may be that the data of the initial transmission may not be delayed significantly in case UL transmissions are dropped. Still another advantage may be that data may be received in the correct order by the receiving node even when initial transmissions are dropped because a channel is determined to be busy.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 8 illustrates an example HARQ process, according to certain embodiments;

FIG. 9 illustrates an exemplary LAA process wherein an initial transmission is dropped, in certain embodiments;

DETAILED DESCRIPTION

According to certain embodiments, the behavior of a wireless device will be determined based on the outcome of a listen-before-talk (LBT) mechanism. Specifically, before a wireless device transmits data, the wireless device will determine whether the wireless device can successfully perform the transmission. In the case where, the wireless device determines not to perform the transmission, the wireless device will make the data which was intended for the transmission available such that the data may be sent in a subsequent subframe. For example, the wireless device may transmit the data in the next subframe identified by a subsequent HARQ process.

Figure 1:
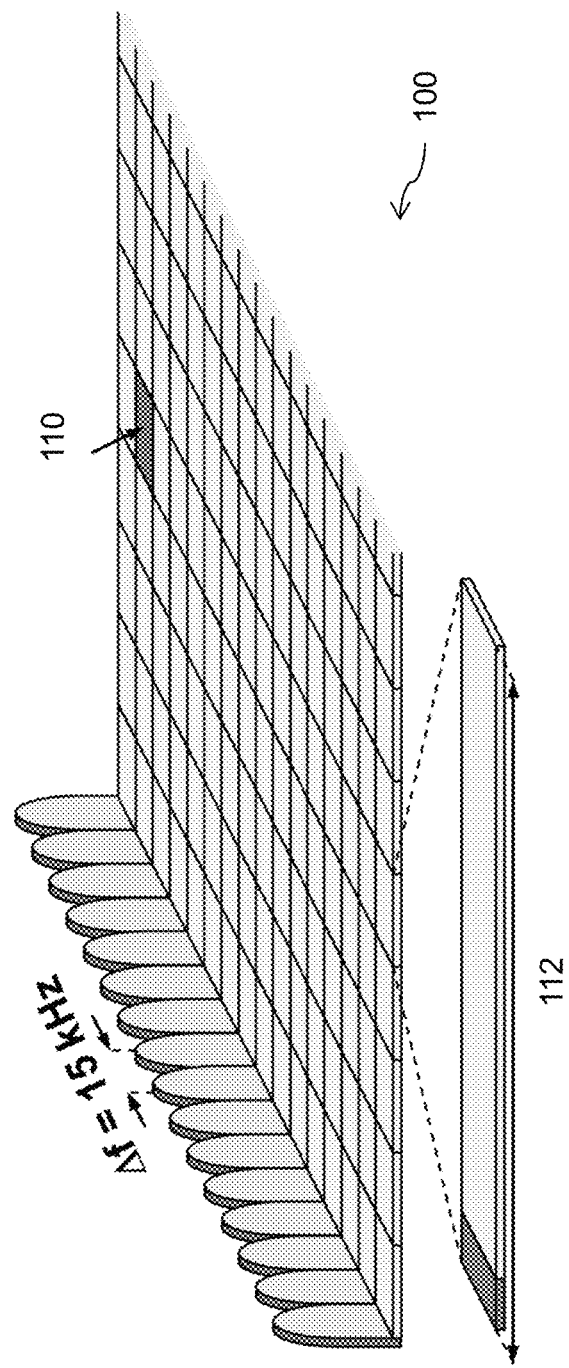
FIG. 1 illustrates an example time-frequency grid, according to certain embodiments.
Figure 2:
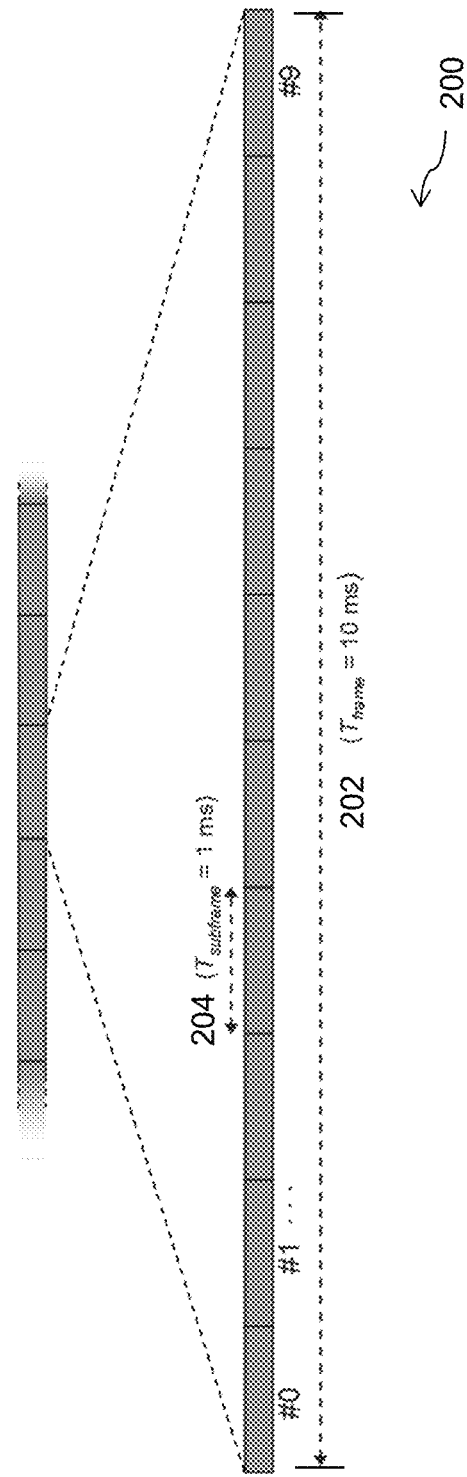
FIG. 2 illustrates an exemplary time-domain structure, according to certain embodiments.
Figure 3:
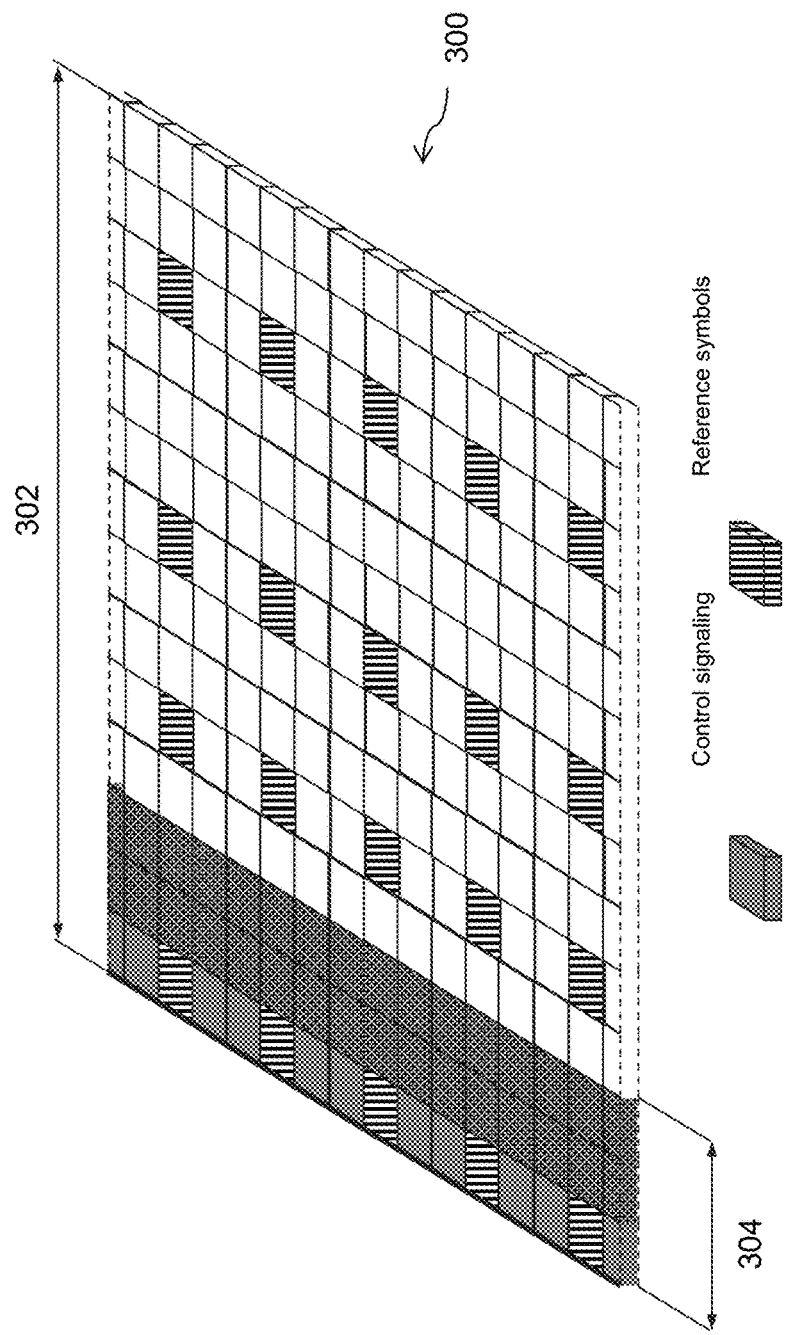
FIG. 3 depicts an exemplary downlink subframe structure, according to certain embodiments.
Figure 4:
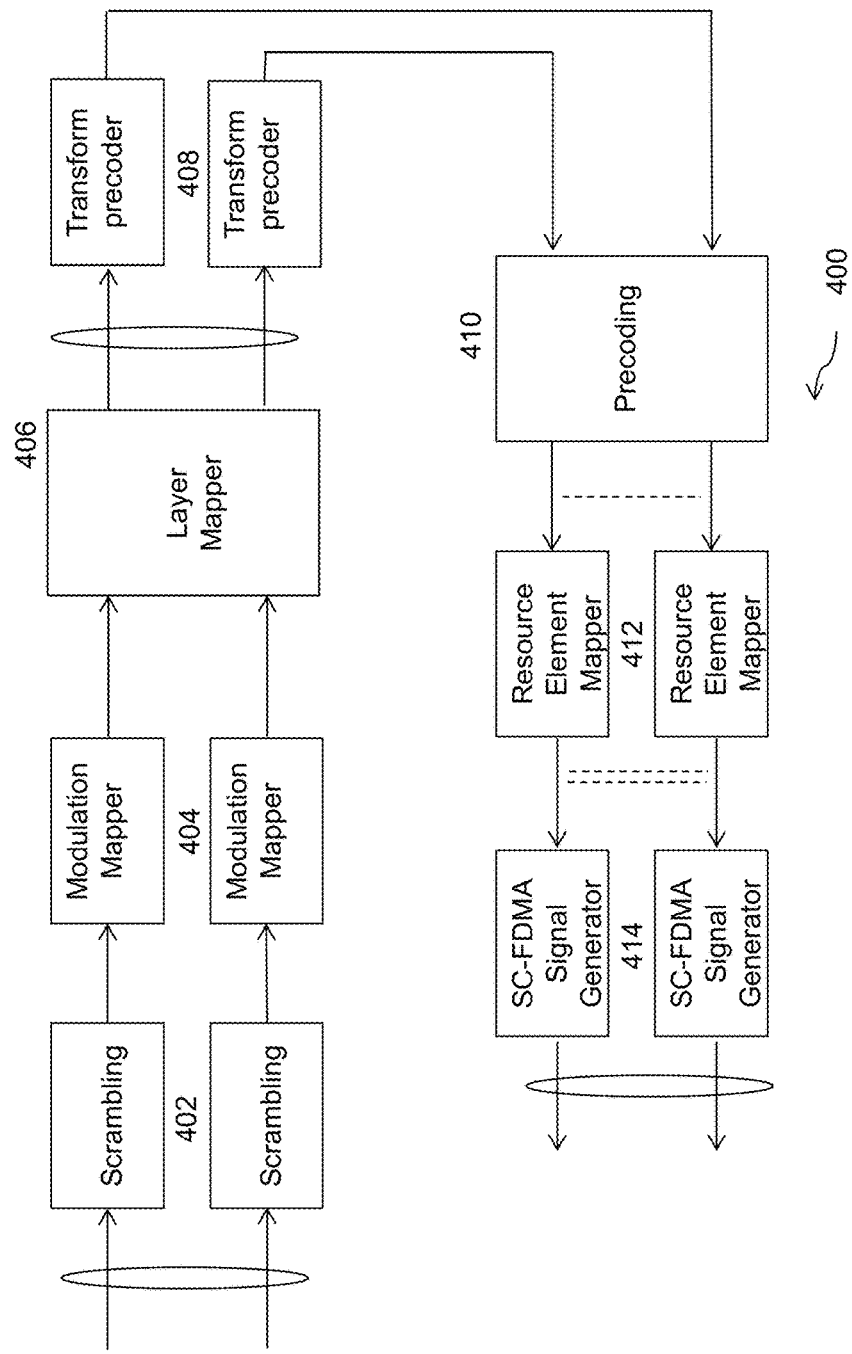
FIG. 4 illustrates an exemplary specific baseband processing chain, according to certain embodiments.
Figure 5:
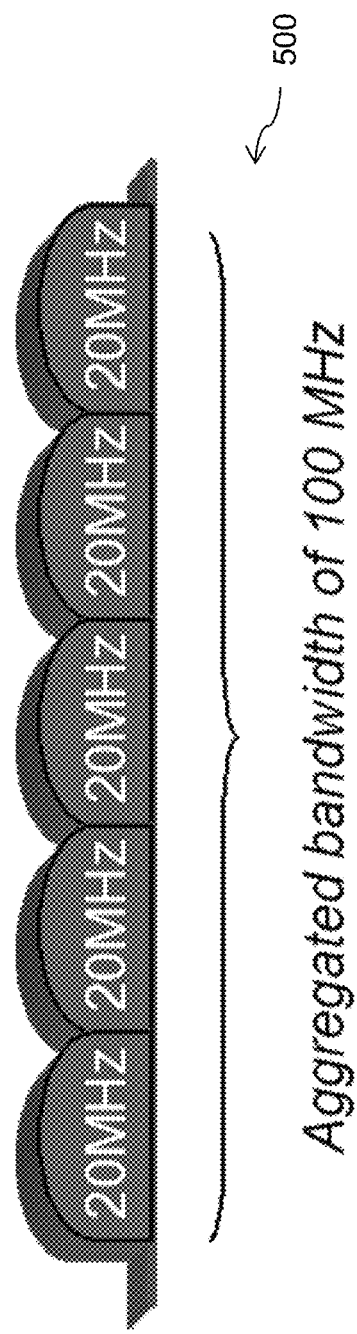
FIG. 5 illustrates an exemplary carrier aggregation scheme, according to certain embodiments.
Figure 6:
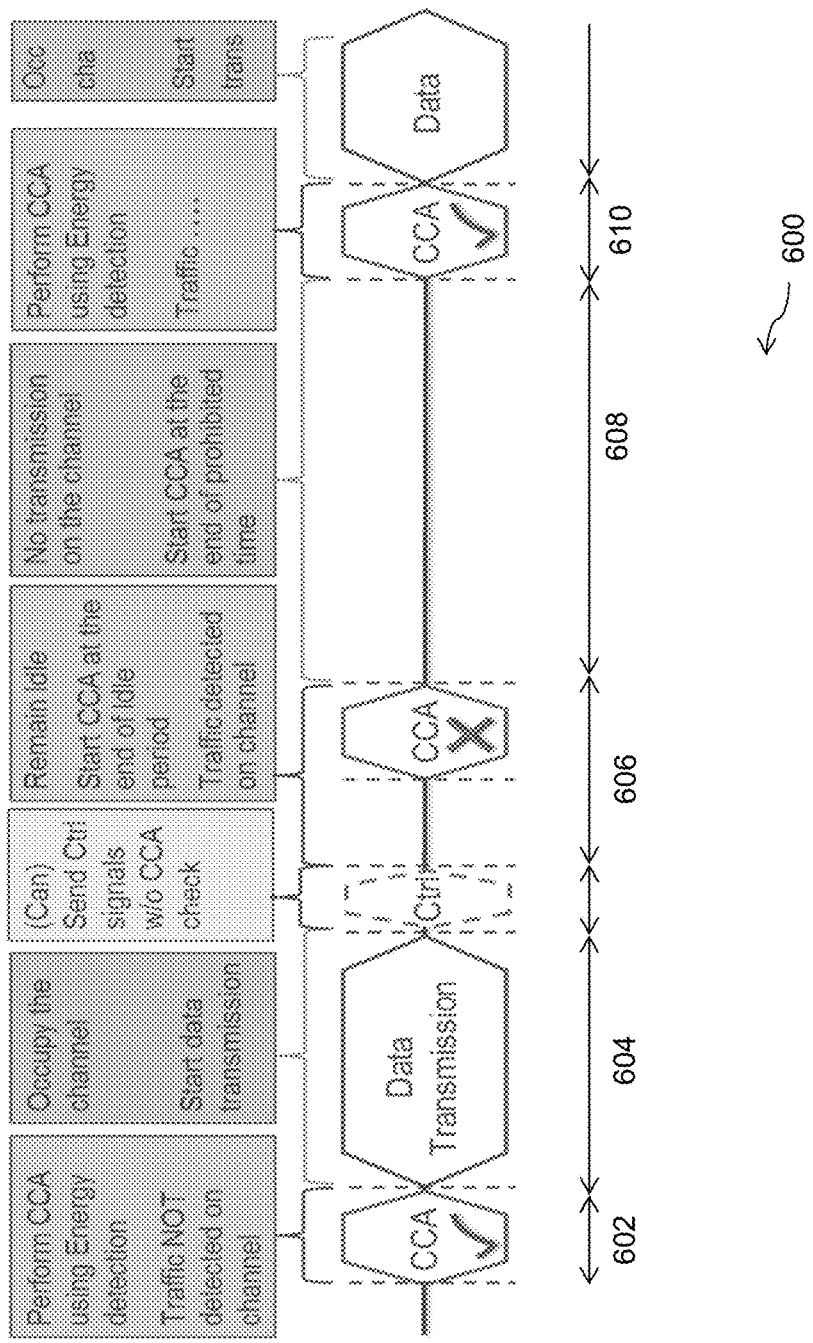
FIG. 6 illustrates an example CSMA/CA scheme, according to certain embodiments.
Figure 7:
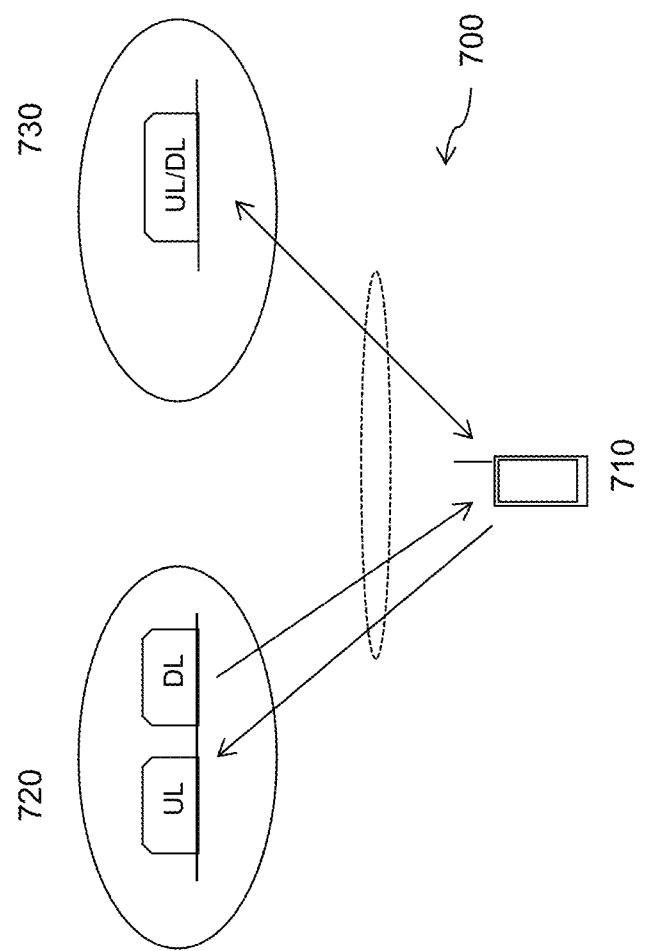
FIG. 7 illustrates an exemplary network system providing LAA in the unlicensed spectrum using LTE carrier aggregation, according to certain embodiments.
Figure 10:
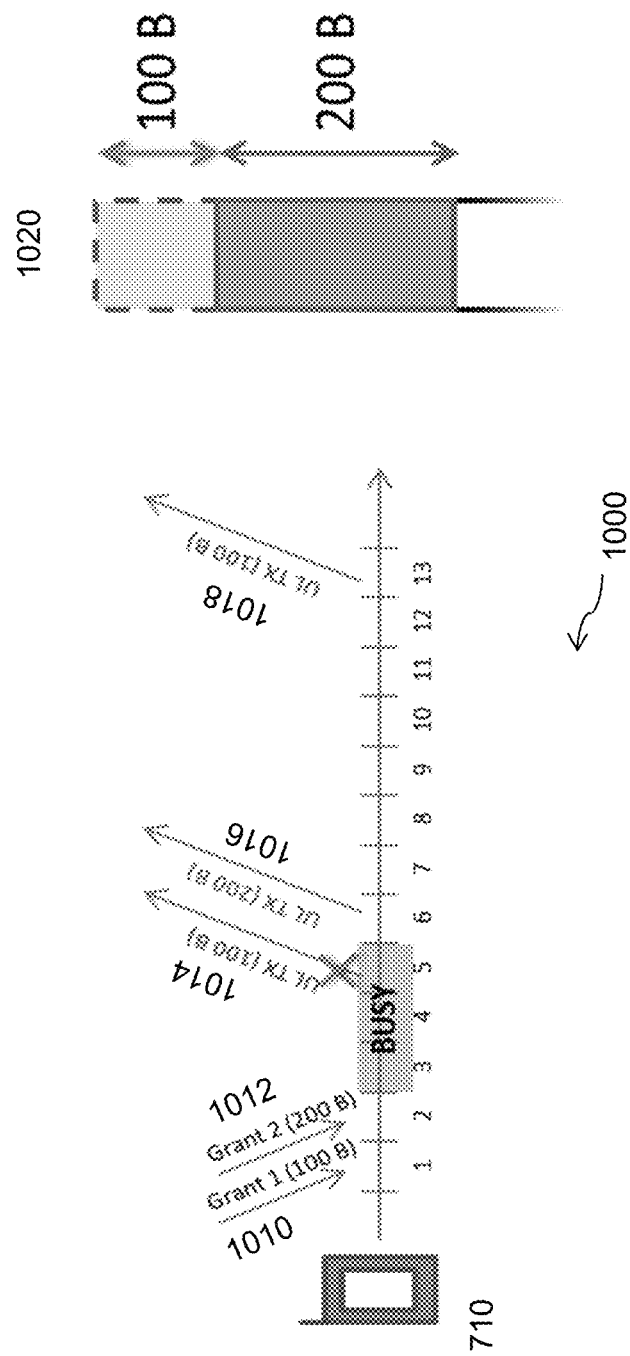
FIG. 10 illustrates an exemplary LAA scenario wherein the data transmissions are received in the wrong order, according to certain embodiments.
Figure 11:
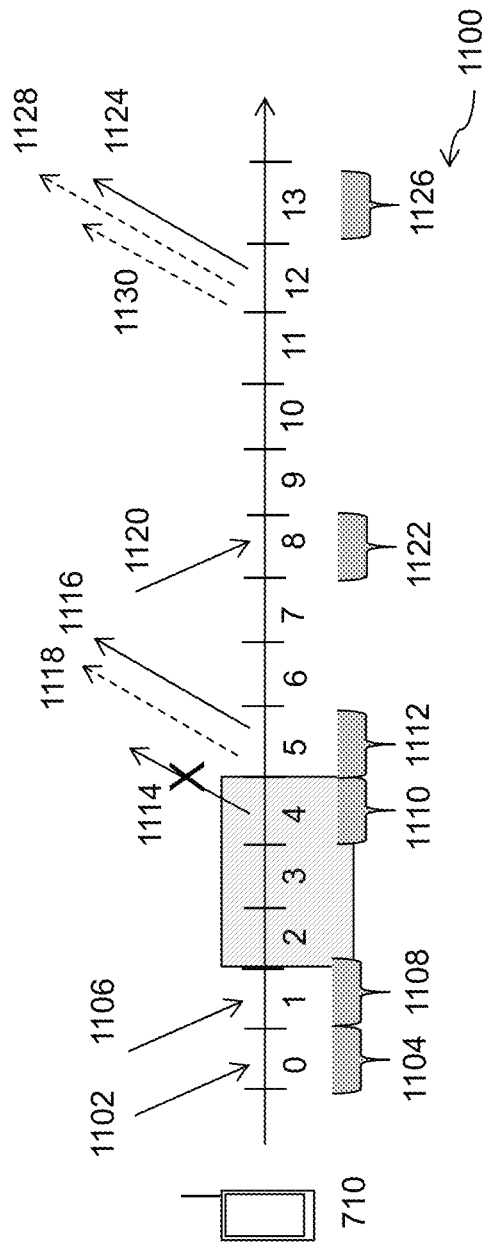
FIG. 11 illustrates an exemplary license assisted access (LAA) timing diagram wherein a wireless device retains previously scheduled data in a buffer for transmission after a subsequent HARQ process, according to certain embodiments.

FIG. 11 illustrates an exemplary license assisted access (LAA) timing diagram wherein a wireless device 710 retains previously scheduled data in a buffer for transmission after a subsequent HARQ process, according to certain embodiments. As shown, wireless device 710 receives two grants for initial transmission. Specifically, wireless device receives first grant 1102 in a first transmission time interval 1104 and a second grant 1104 in a second transmission time interval. In the illustrated example, the first transmission time interval 1104 corresponds with subframe 0, and the second transmission time interval 1108 corresponds with subframe 1.

First and second grants 1102 and 1106 grant permission to wireless device 710 to transmit data within specified parameters. Specifically, first grant 1102 is valid for transmission of a first amount of data during a third transmission time interval 1110. Likewise, second grant 1106 is valid for transmission of a second amount of data during a fourth transmission time interval 1112. As depicted, the third transmission time interval 1110 corresponds with subframe 4 and the fourth transmission time interval 1112 corresponds with subframe 5. However the particular subframes are provided merely as examples. The third and fourth transmission time intervals 1110 and 1112 may correspond with any appropriate subframe in which wireless device 710 is authorized to transmit data.

Prior to the third transmission time interval 1110, wireless device 710 may prepare a first data packet 1114 for transmission in the third transmission time interval 1110. Similarly, prior to the fourth transmission time interval 1112, wireless device 710 may prepare a second data packet 1116 for transmission in the fourth transmission time interval 1112. However, in the depicted scenario, wireless device 710 attempts to transmit the first data packet 1114 in third transmission time interval 1110. In a particular embodiment, wireless device 710 performs an LBT procedure and determines whether the channel is busy in third transmission time interval 1110. Where, as shown, wireless device 710 determines that the channel is busy, wireless device 710 may consider first data packet 1114 as being blocked and drop first data packet 1114. Because the data intended for first data packet 1114 still requires transmission, wireless device 710 makes the data, which was included in first data packet 1114, available for transmission in a subsequent transmission time interval. In the specific embodiment of FIG. 11, for example, wireless device 710 makes the data included in first data packet 1110 available for transmission in the next authorized transmission time interval, which is the fourth transmission time interval 1112 associated with second grant 1106.

It may not be possible, however, for wireless device 710 to merely move the first data packet 114 to fourth transmission time interval 1112. Such a move may not be possible, for example, where third transmission time interval 1110 and fourth transmission time interval 1112 are authorized to accommodate different amounts of data. As noted above, first grant 1102 authorizes a first amount of data and second grant 1106 authorizes a second amount of data. The first and second amounts of data may be the same or they may be different. Where they are different, the transport block authorized for third transmission time interval 1110 may be of a different size than the transport block authorized for fourth transmission time interval 1112. Accordingly, because wireless device 710 cannot merely move first data packet 1114 to third transmission interval 1110, wireless device 710 prepares a third data packet 1118 for transmission in fourth transmission time interval 1112.

In one example scenario, the second amount of data associated with second grant 1106 may be able to accommodate all of the data included in first data packet 1110. For example, where the first amount of data authorized by first grant 1102 (and subsequently included in first data packet 1110) is less than the second amount of data authorized by second grant 1106, the third data packet 1118 comprises all of the data included in first data packet 1114. Additionally, the third data packet 1118 may include at least a portion of the data in the second data packet 1116.

In another example scenario, the second grant 1106 may not accommodate all of the data included in first data packet 1110. For example, if the second amount of data associated with second grant 1106 is less than the first amount of data associated with first grant 1102 (and subsequently included in first data packet 1110), third data packet 1118 may include only a portion of the data included in first data packet 1114. The remaining data that cannot be included in third data packet 1118 will remain stored by wireless device 710 for transmission in the next authorized transmission time interval.

In certain embodiments, when wireless device 710 drops a transmission, wireless device 710 may consider that it did not receive the associated grant and/or that wireless device 710 dropped the associated grant. For example, if wireless device 710 determines based on a LBT procedure that the intended first data packet 1114 is a dropped data packet, wireless device 710 may consider that it never received first grant 1102 and/or that it dropped first grant 1102. This may be implemented by wireless device 710 not placing the data in/assigning the data to the HARQ buffer. Thus, if the channel is busy, wireless device 710 may not place the data for transmission time interval 1110 in the HARQ buffer. Herein, a data packet that is not transmitted may be referred to as a blocked transmission or blocked data packet. A data packet that is transmitted may be referred to as a transmitted data packet or successful transmission. Likewise, a transmission time interval associated with a blocked data packet may be called a blocked transmission time interval, and a transmission time interval associated with a transmitted data packet may be called a successful transmission time interval. Additionally, the term transmission time interval may be used interchangeably with the term subframe, and a subframe may be designated as a blocked subframe or a transmitted or successful subframe.

Figure 12:
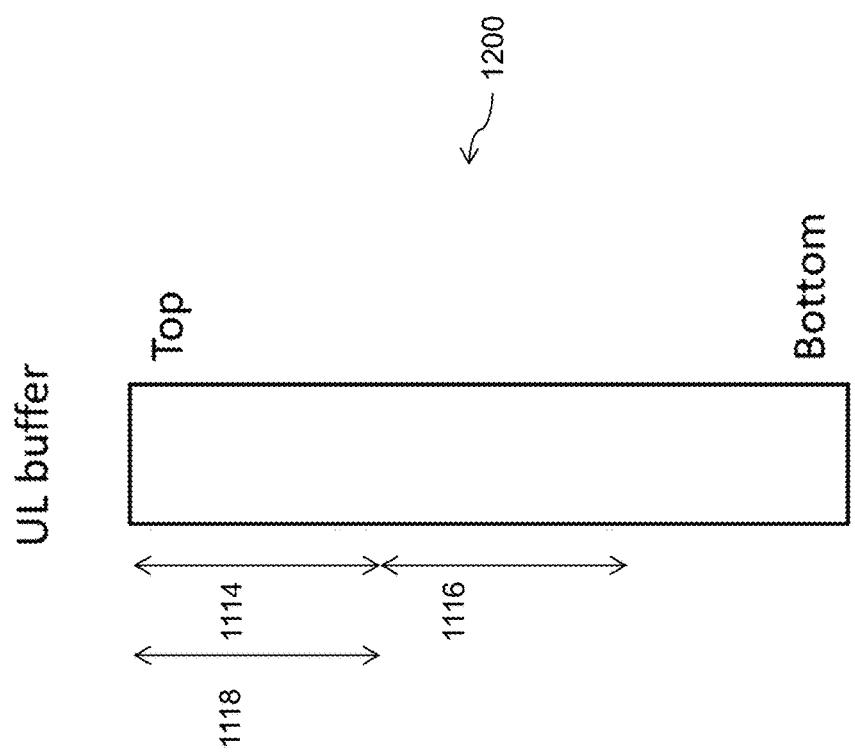
FIG. 12 illustrates an exemplary uplink or HARQ buffer, according to certain embodiments.

Due to hardware limitations, wireless device 710 may need to process and prepare the UL transmissions prior to them being transmitted. For example, referring to FIG. 11, wireless device 710 may need to prepare the data packet to be transmitted in fourth transmission time interval 1112 before wireless device 710 knows whether first data packet 1114 will be blocked in transmission time interval 1110. FIG. 12 illustrates an exemplary uplink or HARQ buffer 1200 storing the data for subsequent transmissions, according to certain embodiments.

Since wireless device 710 will, in certain embodiments, consider data included in a dropped or blocked transmission as being available for any subsequent transmission opportunity, the techniques disclosed herein put some processing requirements on wireless device 710. Specifically, wireless device 710 needs to be prepared to send different transmissions during each authorized transmission time interval depending on whether the data packets intended for earlier transmission time intervals were blocked or transmitted.

FIG. 12 illustrates an exemplary uplink buffer 1200 storing data for subsequent transmissions, according to certain embodiments. As shown, first data packet 1114 is created from the data at the top of the uplink buffer 1200 for transmission in the first available transmission interval. In the previously described example, wireless device 710 prepares to transmit first data packet 1114 prior to the third transmission time interval 1110. However, because wireless device 710 does not know if first data packet 1114 will be dropped or transmitted, wireless device 710 prepares two packets for transmission in fourth transmission time interval 1112. Specifically, wireless device 710 prepares second data packet 1116, which includes the data immediately following the data allocated to first data packet 1114. Additionally, in the case that first data packet 1114 is not transmitted, wireless device 710 also prepares a third data packet 1118, which an appropriate amount of data selected from the top of buffer 1200. In the example embodiment shown in FIG. 12, the amount of data included in first data packet 1114, second data packet 1116, and third data packet 1118 is depicted as being approximately equal. However, as discussed above the size of the data packets depends upon the amount of data authorized for a specific grant associated with a specific transmission time interval. Thus, first data packet 1114 and second data packet 1116 may be of different sizes. Additionally, because third data packet is only transmitted if first data packet 1114 is dropped, third data packet 1118 should be of the same size as second data packet 1116 and will include some of the data of first data packet 1114. In the case where the amount of data associated with fourth transmission time interval 1112 is less than the amount of data allocated to third transmission time interval 1110, third data packet 1118 may not include all of the data of the first data packet 1114. Conversely, in the case where the amount of data associated with fourth transmission time interval 1112 is more than the amount of data allocated to third transmission time interval 1110, third data packet 1118 will include all of the data of first data packet 1114 and some of the data of second data packet 1116.

The above described example considers only first and second grants 1102 and 1106 authorizing transmission in third and fourth transmission time intervals 1110 and 1112. However, it may be recognized that wireless device 710 may be scheduled for additional transmissions. With each authorized transmission time interval, the number of data packets wireless device 710 should be prepared to transmit escalates.

For example, returning to FIG. 11, wireless device 710 may receive a third grant 1120 that authorizes transmission during a sixth transmission time interval 1126. Thus, wireless device 710 may be scheduled to perform three transmissions and any one of these transmissions may be dropped. The situation of where first data packet 1114 is dropped is discussed above, and at least a portion of the data intended for first data packet 1114 is transmitted in fourth transmission time interval 1112 as a third data packet 1118. It is additionally noted that third data packet 1118 may include some or none of what was intended for second data packet 1112, depending on the amount of data authorized for transmission in fourth transmission time interval 1112. However, in the case where third data packet 1118 is transmitted in the place of second data packet 1116, wireless device 710 then considers second data packet 1116 to be a dropped transmission. In this case, wireless device 710 must prepare data packets for transmission in sixth transmission time interval 1126 that take into account all of the described contingencies. Accordingly, in the above described example, fourth and fifth data packets 1124 and 1128 may include data that overlaps with the data of first data packet 1114, second data packet 1116, and/or third data packet 1118.

Generally, because third grant 1120 may be received before wireless device 710 is able to determine whether the data transmissions of third and fourth transmission time intervals 1110 and 1112 were dropped or successful, wireless device 710 must be prepared to do any of the following during the sixth transmission time interval 1126:

In the case where first data packet 1114 is successful and second data packet 1116 is successful, wireless device transmits fourth data packet 1124. Referring to FIG. 12, the data of fourth data packet 1124 would include data from buffer 1200 that follows the data allocated to second data packet 1118. In this instance, there is no overlap between the data transmitted during the three transmission opportunities associated with the three grants.

In the case where first data packet 1114 is blocked, second data packet 1116 is replaced with third data packet 1118, and third data packet 1118 is successful, wireless device 710 transmits fifth data packet 1128. The data of fifth data packet 1128 would include data following the data that was actually transmitted during the second transmission opportunity (i.e., transmission time interval 1112 in FIG. 11). Depending upon the amount of data authorized during the second and third transmission opportunities, the third data transmission may include any remaining data from first data packet 1114 and second data packet 1116 that wasn't transmitted during the second transmission opportunity as well as some portion of data following second data packet 1116 in buffer 1200.

In the case where first data packet 1114 is blocked, second data packet 1116 would be replaced with third data packet 1118 but is blocked instead, wireless device 710 would transmit sixth data packet 1130. Because there has been no successful transmission prior to the third transmission opportunity (i.e., transmission time interval 1126 in FIG. 11), the data of sixth data packet 1130 would include data from the top of buffer 1200. Stated differently, the data transmitted during the third transmission opportunity would overlap with at least a portion of the first data packet 1114. Additionally, depending upon the amount of data authorized for transmission during the third transmission opportunity, the data might include some or all of the data originally allocated to second data packet 1116 and fifth data packet 1124.

Because any of these scenarios are possible, a wireless device 710 receiving three grants and authorized to send three different transmissions should prepare four different transmissions to be performed in the third transmission opportunity (i.e., sixth transmission time interval 1126). Additionally, depending on whether the first and second data packets are blocked/transmitted, wireless device 710 should select which version of the third transmission that should be performed. As stated above, the content of the second transmission would depend on whether the first transmission is blocked or transmitted and would affect the content of the third transmission. The higher the number of authorized transmissions, the more possible transmissions the wireless device 710 should prepare.

Figure 13:
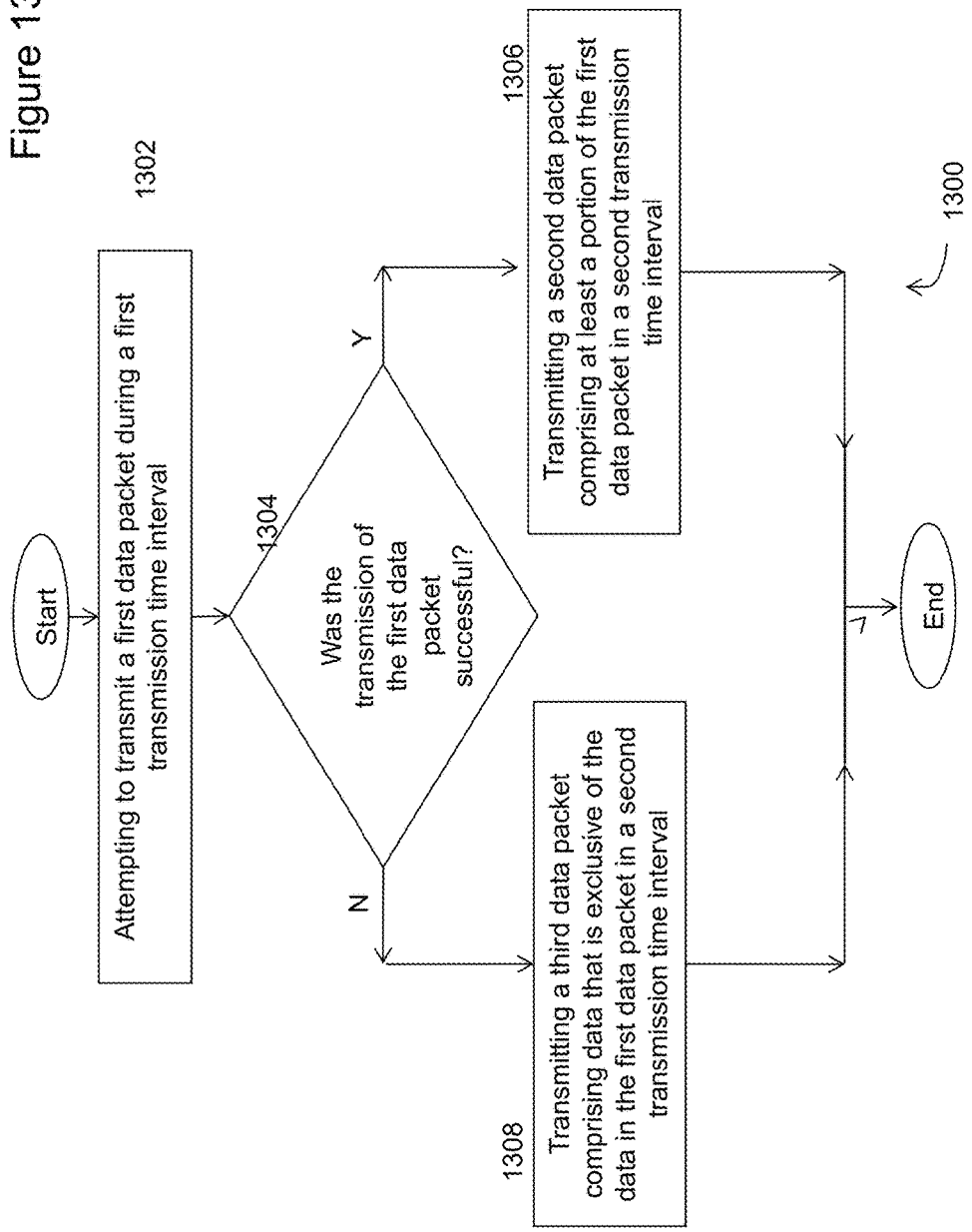
FIG. 13 illustrates an exemplary method performed by a wireless device that considers previously dropped transmissions when selecting data to transmit in LAA, according to certain embodiments.

FIG. 13 illustrates an exemplary method performed by a wireless device that considers previously dropped transmissions when selecting data to transmit, according to certain embodiments. Though the method described herein may be used for the transmission of data in LAA, it is generally recognized that a network utilizing LAA is just one exemplary embodiment in which the method may be employed.

The method begins at step 1302 when wireless device 710 attempts to transmits first data packet during a first transmission time interval (shown as first data packet 1114 in subframe 4 in FIG. 11. At step 1304, wireless device 710 determines if the transmission of the first data packet was a successful. Stated differently, wireless device 710 may determine if the transmission of the first data packet was a dropped transmission. In a particular embodiment, the first data packet may be determined to be a dropped transmission if wireless device 710 performs a listen before talk procedure that identifies that the channel is busy during the transmission time interval associated with the first data packet. Additionally or alternatively, wireless device 710 may determine that the first data packet was not a dropped transmission where an acknowledgment is received from the network node receiving the first data packet.

If it is determined that the transmission of the first data packet was successful and the transmission was not a dropped transmission, the method continues to step 1306. At step 1306, wireless device 710 transmits a second data packet during a second transmission time interval (shown as second data packet 1116 transmitted during subframe 5 in FIG. 11). The data of the second data packet 1116 includes the data in the buffer 1200 that followed the data allocated to the first data packet, which may then be removed from buffer 1200 when it is determined that the transmission of the first data packet was successful. Alternatively, the data allocated to the first data packet may be removed after wireless device 710 receives an acknowledgment of receipt from a network node.

Returning to step 1304, if it is determined that the transmission of the first data packet was not successful and the transmission was a dropped transmission, wireless device 710 transmits a third data packet at step 1308 during the second transmission time interval (shown as third data packet 1118 transmitted during subframe 5 in FIG. 11). To generate the third data packet, wireless device 710 pulls data from the top of the buffer 1200. Thus, the third data packet includes at least a portion of the data of the first data packet. The method then terminates or may be repeated for the next authorized transmission.

Figure 14:
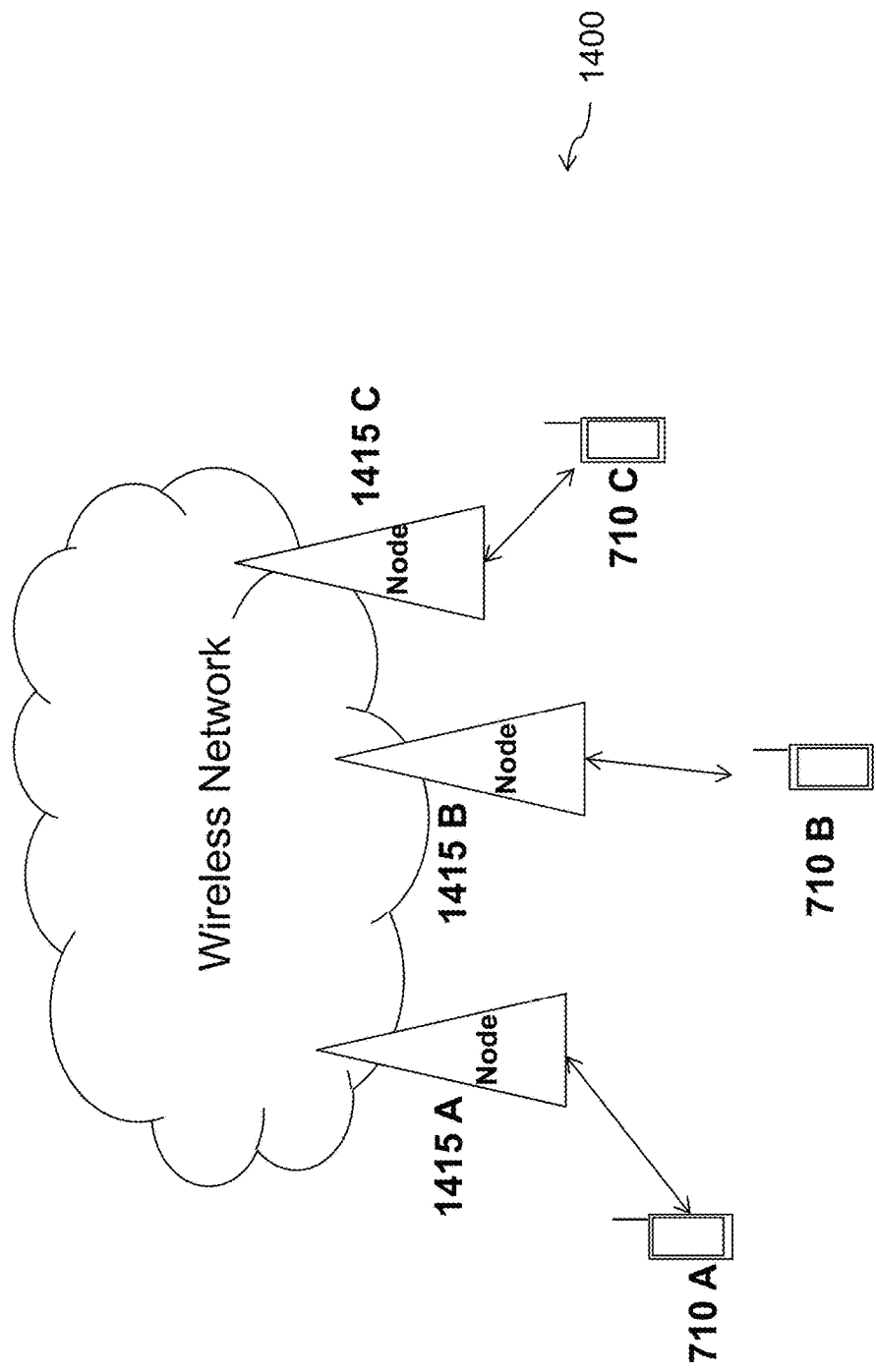
FIG. 14 illustrates an exemplary wireless network, according to certain embodiments.

FIG. 14 is a block diagram illustrating embodiments of a radio network 1400, according to certain embodiments. Network 1400 includes one or more wireless devices 710A-C (which may be interchangeably referred to as wireless devices 710), network node(s) 1415A-C (which may be interchangeably referred to as network nodes or eNodeBs (eNBs) 1415). A wireless device 710 may communicate with a radio network node 1415 over a wireless interface. For example, wireless device 710A-C may transmit wireless signals to a radio network node 1415A-C and/or receive wireless signals from radio network node 1415. The wireless signals may contain voice traffic, data traffic, control signals, and/or any other suitable information. In some embodiments, an area of wireless signal coverage associated with a network node 1415 may be referred to as a cell. In some embodiments, wireless devices 710 may have D2D capability. Thus, wireless devices 710 may be able to receive signals from and/or transmit signals directly to another wireless device 710. For example, wireless device 710A may be able to receive signals from and/or transmit signals to wireless device 710B.

In certain embodiments, network nodes 1415 may interface with a radio network controller. The radio network controller may control network nodes 1415 and may provide certain radio resource management functions, mobility management functions, and/or other suitable functions. The radio network controller may interface with a core network node, in certain embodiments. For example, in certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionality for wireless devices 710. Wireless device 710 may exchange certain signals with the core network node using the non-access stratum layer. In non-access stratum signaling, signals between wireless device 710 and the core network node may be transparently passed through the radio access network.

As described above, example embodiments of network 1400 may include one or more wireless devices 710, and one or more different types of network nodes capable of communicating (directly or indirectly) with wireless devices 710. Examples of the network nodes include radio network nodes 1415 or another wireless device over radio signals. The network may also include any additional elements suitable to support communication between wireless devices 710 or between a wireless device 710 and another communication device (such as a landline telephone). Wireless device 710 may also be a radio communication device, target device, device-to-device (D2D) UE, machine-type-communication UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE), etc. Also, in some embodiments generic terminology such as "radio network node" or simply "network node" is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT, or any suitable network node. The terminology such as network node and UE should be considering non-limiting and does in particular not imply a certain hierarchical relation between the two; in general "eNodeB" could be considered as device 1 and "UE" device 2, and these two devices communicate with each other over some radio channel. Example embodiments of wireless devices 710, network nodes 1415, and other network nodes (such as radio network controller or core network node) are described in more detail below with respect to FIGS. 15 and 17, respectively.

The terms wireless device 710 and network node 1415, as used herein, are considered general terms and are intended to be considered as non-limiting. For example, "network node" may correspond to any type of radio network node or any network node, which communicates with wireless device 710 and/or another network node 1415. Examples of network nodes 1415 may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 1415 and/or with another wireless device 710 in a cellular or mobile communication system. Examples of wireless devices 710 include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

Although FIG. 14 illustrates a particular arrangement of network 1400, the present disclosure contemplates that the various embodiments described herein may be applied to a variety of networks having any suitable configuration. For example, network 1400 may include any suitable number of wireless devices 710 and network nodes 1415, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

Figure 15:
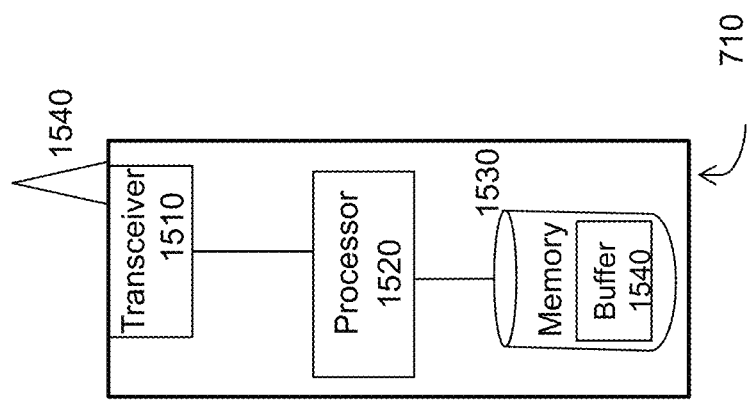
FIG. 15 illustrates an example wireless device, according to certain embodiments.

FIG. 15 is a block diagram illustrating certain embodiments of a wireless device 710. Examples of wireless device 710 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 710 may also be referred to as user equipment (UE), a station (STA), a device, or a terminal in some embodiments. Wireless device 710 includes transceiver 1510, processor 1520, and memory 1530. In some embodiments, transceiver 1510 facilitates transmitting wireless signals to and receiving wireless signals from radio network node 1415 (e.g., via an antenna), processor 1520 executes instructions to provide some or all of the functionality described above as being provided by wireless device 1510, and memory 1530 stores the instructions executed by processor 1520.

Processor 1520 may include any suitable combination of hardware and software implemented in one or more modules to execute instructions and manipulate data to perform some or all of the described functions of wireless device 710. In some embodiments, processor 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 710 may include additional components beyond those shown in FIG. 15 that may be responsible for providing certain aspects of the wireless device's functionality, including any of the functionality described above and/or any additional functionality (including any functionality necessary to support the solution described above).

Figure 16:
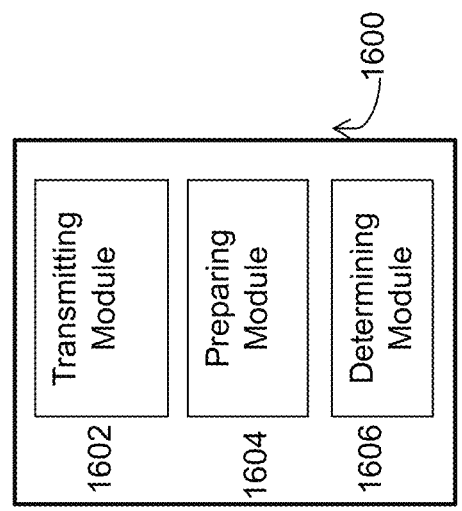
FIG. 16 illustrates an example virtual computing apparatus for considering previously dropped transmissions when selecting data to transmit in LAA, according to certain embodiments.

FIG. 16 illustrates an example virtual computing apparatus for considering previously dropped transmissions when selecting data to transmit, according to certain embodiments. As depicted, the virtual apparatus 1600 includes at least one transmitting module 1602, at least one determining module 1604, and at least one transmitting module 1606.

Transmitting module 1602 may perform the transmitting functions of wireless device 710 during a first transmission time interval, as described herein. For example, transmitting module 1402 may attempt to transmit a first data packet during the first transmission time interval.

Determining module 1604 may perform the determining functions of wireless device 710, as described herein. For example, prior to a second transmission time interval, determining module 1604 may determine whether the first data packet is a dropped transmission.

Transmitting module 1606 may perform the transmitting functions of wireless device 710 during a second transmission time interval, as described herein. For example, transmitting module 1606 may transmit a second data packet if it is determined that the first data packet is a dropped transmission. The second data packet may include at least a portion of the data of the first data packet in the second transmission time interval. Conversely, if determining module 1604 determines that the first data packet is not a dropped data packet, transmitting module 1606 may transmit a third data packet during the second transmission time interval. The third data packet may include data that is exclusive of the data of the first data packet.

Other embodiments of the virtual computing apparatus may include additional components beyond those shown in FIG. 16 that may be responsible for providing certain aspects of the network node's functionality, including any of the functionality described above and/or any additional functionality (including any functionality necessary to support the solution described above).

Figure 17:
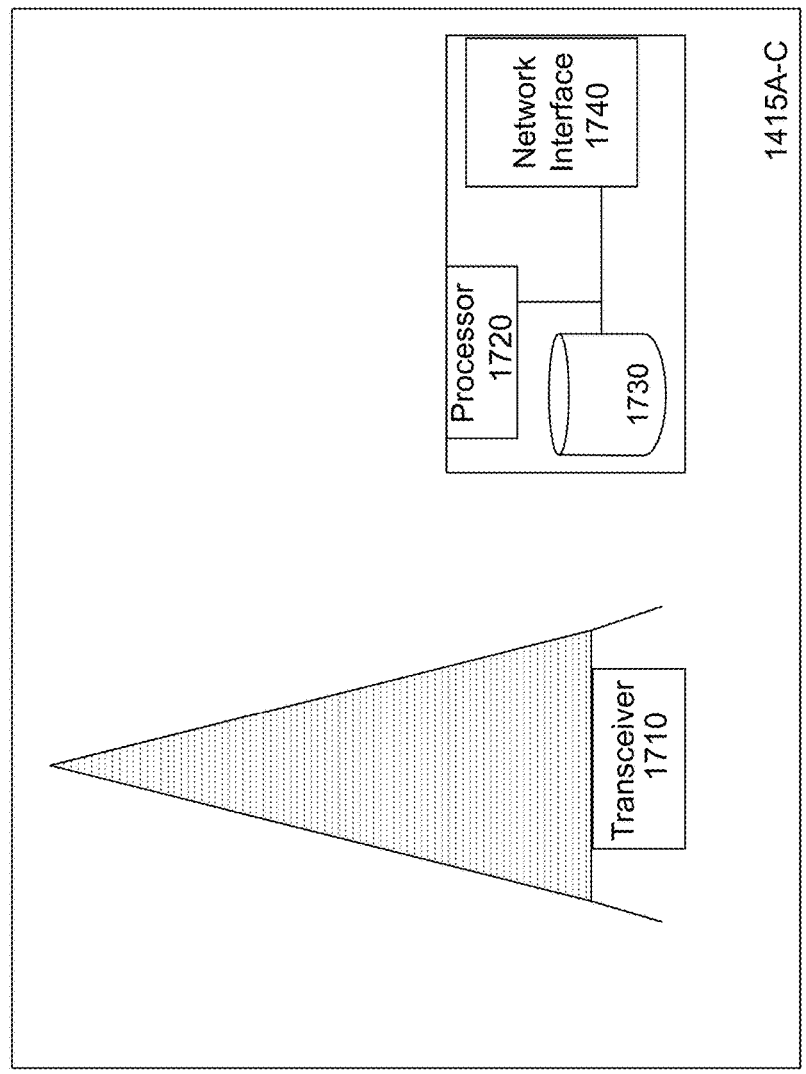
FIG. 17 illustrates an example network node, according to certain embodiments.

FIG. 17 is a block diagram illustrating certain embodiments of a radio network node 1415. Examples of radio network node 1415 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 1415 may be deployed throughout network 1400 as a homogenous deployment, heterogeneous deployment, or mixed deployment. A homogeneous deployment may generally describe a deployment made up of the same (or similar) type of radio network nodes 1415 and/or similar coverage and cell sizes and inter-site distances. A heterogeneous deployment may generally describe deployments using a variety of types of radio network nodes 1415 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 1415 may include one or more of transceiver 1710, processor 1720, memory 1730, and network interface 1740. In some embodiments, transceiver 1710 facilitates transmitting wireless signals to and receiving wireless signals from wireless device 710A-C (e.g., via an antenna), processor 1720 executes instructions to provide some or all of the functionality described above as being provided by a radio network node 1415, memory 1730 stores the instructions executed by processor 1720, and network interface 1740 communicates signals to backend network components, such as a gateway, switch, router, Internet, Public Switched Telephone Network (PSTN), core network nodes 1430, radio network controllers 1420, etc.

Processor 1720 may include any suitable combination of hardware and software implemented in one or more modules to execute instructions and manipulate data to perform some or all of the described functions of radio network node 1415. In some embodiments, processor 1720 may include, for example, one or more computers, one or more central processing units (CPUs), one or more microprocessors, one or more applications, and/or other logic.

Memory 1730 is generally operable to store instructions, such as a computer program, software, an application including one or more of logic, rules, algorithms, code, tables, etc. and/or other instructions capable of being executed by a processor. Examples of memory 1730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1740 is communicatively coupled to processor 1720 and may refer to any suitable device operable to receive input for radio network node 1415, send output from radio network node 1415, perform suitable processing of the input or output or both, communicate to other devices, or any combination of the preceding. Network interface 1740 may include appropriate hardware (e.g., port, modem, network interface card, etc.) and software, including protocol conversion and data processing capabilities, to communicate through a network.

Other embodiments of radio network node 1415 may include additional components beyond those shown in FIG. 17 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Some embodiments of the disclosure may provide one or more technical advantages. For example, in certain embodiments, a wireless device applying listen before talk on an LAA carrier may consider the data of the dropped transmission as being available during a subsequent transmission time interval. As a result, the delay for sending data on LAA carriers may be reduced. As another example, an advantage of the proposed solutions may be that the data of the initial transmission may not be delayed significantly in case UL transmissions are dropped. Still another advantage may be that data may be received in the correct order by the receiving node even when initial transmissions are dropped because a channel is determined to be busy.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Other implementations may include a wireless communication device and/or access node configured to implement the described method, or a wireless communication system in which a wireless communication device and/or access node implement the described method.

Modifications, additions, or omissions may be made to the methods disclosed herein without departing from the scope of the invention. The methods may include more, fewer, or other steps. Additionally, steps may be performed in any suitable order.

The invention claimed is:

1. A method by a wireless device for handling uplink transmissions, the method comprising:
    receiving a first grant authorizing the wireless device to transmit a first amount of data during a first transmission time interval, wherein the first amount of data comprises a first data packet;
    attempting to transmit, to a network node, the first data packet during the first transmission time interval in accordance with the first grant;
    determining whether a transmission of the first data packet during the first transmission time interval was successful;
    preparing a second data packet for transmission during a second transmission time interval;
    preparing a third data packet for transmission during the second transmission time interval;
    receiving a second grant authorizing the wireless device to transmit a second amount of data if the transmission of the first data packet during the first transmission time interval was successful or receiving the second grant authorizing the wireless device to transmit a third amount of data if the transmission of the first data packet during the first transmission time interval was not successful, wherein the second amount of data comprises the second data packet; and
    during the second transmission time interval that is subsequent to the first transmission time interval:
        transmitting the second data packet if the transmission of the first data packet during the first transmission time interval was successful, the second data packet comprising data that is exclusive of the data of the first data packet; or
        transmitting the third data packet if the transmission of the first data packet during the first transmission time interval was not successful, the third data packet comprising data that comprises at least a portion of the data of the first data packet.

2. The method of claim 1, wherein:
the first amount is less than the second amount; and
the third data packet comprises all of the data included in the first data packet and at least a portion of the data in the second data packet.

3. The method of claim 1, wherein:
the first amount is greater than the second amount; and
the third data packet comprises only the portion of the data in the first data packet.

4. The method of claim 1, further comprising:
prior to a third transmission time interval, determining whether a transmission during the second transmission time interval of the second data packet or third data packet was successful; and
during a third transmission time interval that is subsequent to the second transmission time interval:
    transmitting a fourth data packet if the transmission of the first data packet during the first transmission time interval and the transmission of the second data packet during the second transmission time interval was successful, the fourth data packet comprising data that is exclusive of the data of the first data packet and the second data packet; and
    transmitting a fifth data packet if at least one of the transmission of the first data packet during the first transmission time interval and the transmission of the second data packet or the third data packet during the second transmission time interval was not successful, the fifth data packet comprising data selected from the data from at least one of the first data packet, the second data packet, or the third data packet.

5. The method of claim 4, further comprising:
prior to the third transmission time interval that is subsequent to the second transmission time interval, receiving a third grant authorizing wireless device to transmit data during the third transmission time interval;
preparing the fourth data packet for transmission during the third transmission time interval; and
preparing the fifth data packet for transmission during the third transmission time interval.

6. The method of claim 5, further comprising:
maintaining an uplink buffer storing the data used to form at least one of the first data packet, the second data packet, third data packet, fourth data packet and fifth data packet.

7. The method of claim 1, further comprising:
in response to determining that the transmission of the first data packet was successful, removing the data of the first data packet from the uplink buffer.

8. The method of claim 1, wherein the transmission of the first data packet is determined to be not successful in response to determining that an uplink channel is busy.

9. A wireless device for handling uplink transmissions, the wireless device comprising:
    an uplink buffer for storing data to be transmitted on an uplink to a network node; and
    a processor having access to the uplink buffer, the processor operable to:
        receive a first grant authorizing the wireless device to transmit a first amount of data during a first transmission time interval, wherein the first amount of data comprises a first data packet;
        attempt to transmit, to the network node, the first data packet during the first transmission time interval in accordance with the first grant;
        determine whether a transmission of the first data packet during the first transmission time interval was successful;
        prepare a second data packet for transmission during a second transmission time interval;

prepare a third data packet for transmission during the second transmission time interval;
receive a second grant authorizing the wireless device to transmit a second amount of data if the transmission of the first data packet during the first transmission time interval was successful or receive the second grant authorizing the wireless device to transmit a third amount of data if the transmission of the first data packet during the first transmission time interval was not successful, wherein the second amount of data comprises the second data packet; and
during the second transmission time interval that is subsequent to the first transmission time interval,
transmit the second data packet if the transmission of the first data packet during the first transmission time interval was successful, the second data packet comprising data that is exclusive of the data in the first data packet; or
transmit the third data packet if the transmission of the first data packet during the first transmission time interval was not successful, the third data packet comprising data that includes at least a portion of the data of the first data packet.

10. The wireless device of claim 9, wherein:
the first amount is less than the second amount; and
the third data packet comprises all of the data included in the first data packet and at least a portion of the data in the second data packet.

11. The wireless device of claim 9, wherein:
the first amount is greater than the second amount; and
the third data packet comprises only the portion of the data in the first data packet.

12. The wireless device of claim 9, wherein the processor is further operable to:
prior to a third transmission time interval, determine whether a transmission of during the second transmission time interval of the second data packet or third data packet was successful; and
during a third transmission time interval that is subsequent to the second transmission time interval:
transmit a fourth data packet if the transmission of the first data packet during the first transmission time interval and the transmission of the second data packet or the third data packet during the second transmission time interval was successful, the fourth data packet comprising data that is exclusive of the data of the first data packet and the second data packet; and
transmit a fifth data packet if at least one of the transmission of the first data packet during the first transmission time interval and the transmission of the second data packet or the third data packet during the second transmission time interval was not successful, the fifth data packet comprising data that is the same as data selected from at least one of the first data packet, the second data packet, or the third data packet.

13. The wireless device of claim 12, wherein the processor is further operable to:
prior to the third transmission time interval that is subsequent to the second transmission time interval,
receive a fourth grant authorizing transmission of data during the third transmission time interval;
prepare the fourth data packet for transmission during the third transmission time interval; and
prepare the fifth data packet for transmission during the third transmission time interval.

14. The wireless device of claim 13, wherein the processor is further operable to:
maintain an uplink buffer storing the data used to form at least one of the first data packet, the second data packet, the third data packet, the fourth data packet, and the fifth data packet.

15. The wireless device of claim 14, wherein the processor is further operable to:
in response to determining that the transmission of the first data packet was successful, remove the data of the first data packet from the uplink buffer.

16. The wireless device of claim 9, wherein the processor is operable to determine that the transmission of the first data packet was not successful in response to determining that an uplink channel is busy.

17. A non-transitory computer readable medium storing logic for handling uplink transmissions, the logic operable when executed by a processor to:
receive a first grant authorizing a wireless device to transmit a first amount of data during a first transmission time interval, wherein the first amount of data comprises a first data packet;
attempt to transmit, to network a node, the first data packet during the first transmission time interval in accordance with the first grant;
determine whether a transmission of the first data packet during the first transmission time interval was successful;
prepare a second data packet for transmission during a second transmission time interval;
prepare a third data packet for transmission during the second transmission time interval;
receive a second grant authorizing the wireless device to transmit a second amount of data if the transmission of the first data packet during the first transmission time interval was successful or receive the second grant authorizing the wireless device to transmit a third amount of data if the transmission of the first data packet during the first transmission time interval was not successful, wherein the second amount of data comprises the second data packet; and
during the second transmission time interval that is subsequent to the first transmission time interval:
transmit the second data packet if the transmission of the first data packet during the first transmission time interval was successful, the second data packet comprising data that is exclusive of the data in the first data packet; or
transmit the third data packet if the transmission of the first data packet during the first transmission time interval was not successful, the third data packet comprising at least a portion of the data of the first data packet.

* * * * *